(12) United States Patent
Motohashi

(10) Patent No.: US 8,688,811 B2
(45) Date of Patent: Apr. 1, 2014

(54) PROJECTOR, PROJECTOR SYSTEM, AND CONTROL METHOD

(75) Inventor: Hiroomi Motohashi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 540 days.

(21) Appl. No.: 12/880,454

(22) Filed: Sep. 13, 2010

(65) Prior Publication Data

US 2011/0066671 A1    Mar. 17, 2011

(30) Foreign Application Priority Data

Sep. 15, 2009 (JP) ................................ 2009-212932

(51) Int. Cl.
*G06F 15/177* (2006.01)
*G06F 15/173* (2006.01)
(52) U.S. Cl.
USPC ........... 709/221; 709/220; 709/222; 709/223; 709/224
(58) Field of Classification Search
USPC ............................ 709/223, 224, 220, 221, 222
See application file for complete search history.

(56) References Cited

U.S. PATENT DOCUMENTS

| | | | |
|---|---|---|---|
| 7,434,166 B2 * | 10/2008 | Acharya et al. ............... | 715/740 |
| 8,166,149 B2 * | 4/2012 | Ishimoto ........................ | 709/223 |
| 8,381,232 B2 * | 2/2013 | Kudo ............................. | 719/318 |
| 2002/0083121 A1 | 6/2002 | Chang et al. .................. | 709/201 |
| 2002/0196378 A1 | 12/2002 | Slobodin et al. | |
| 2003/0110217 A1 | 6/2003 | Raju | |
| 2003/0236889 A1 | 12/2003 | Manion et al. | |
| 2005/0157218 A1 * | 7/2005 | Honma ......................... | 348/744 |
| 2005/0157321 A1 * | 7/2005 | Alacar ......................... | 358/1.13 |
| 2006/0047853 A1 * | 3/2006 | Igarashi et al. ............... | 709/245 |
| 2006/0179124 A1 | 8/2006 | Stefaniak et al. | |
| 2007/0019236 A1 * | 1/2007 | Sando ......................... | 358/1.15 |
| 2007/0073843 A1 * | 3/2007 | Ferreri ......................... | 709/219 |
| 2007/0088780 A1 | 4/2007 | Sato et al. | |
| 2007/0146642 A1 | 6/2007 | Slobodin et al. | |
| 2008/0025501 A1 | 1/2008 | Sato et al. | |
| 2009/0172143 A1 * | 7/2009 | Ishimoto ....................... | 709/223 |
| 2010/0064226 A1 | 3/2010 | Stefaniak et al. | |
| 2010/0100847 A1 | 4/2010 | Sato et al. | |
| 2010/0253592 A1 | 10/2010 | Slobodin et al. | |

FOREIGN PATENT DOCUMENTS

| | | |
|---|---|---|
| EP | 1 376 927 A1 | 1/2004 |
| EP | 1 501 016 A1 | 1/2005 |
| JP | 2007-264079 | 10/2007 |
| JP | 2007-336076 | 12/2007 |

OTHER PUBLICATIONS

Extended European Search Report issued Feb. 3, 2011, in Patent Application No. 10251587.1.

* cited by examiner

*Primary Examiner* — Hieu Hoang
(74) *Attorney, Agent, or Firm* — Oblon, Spivak, McClelland, Maier & Neustadt, L.L.P.

(57) ABSTRACT

A projector connected to a terminal device via a network includes: a confirming unit to confirm whether an IP address has been changed; a creating unit to create an executable file for executing image transfer software using a changed IP address, if the IP address is confirmed to have been changed; a delivering unit to deliver the executable file in response to a request from the terminal device; a receiving unit to receive, from the terminal device in which the image transfer software has been run by the executable file, a connection based on the changed IP address and receive a transfer of image information on an image being displayed in the terminal device; and a projecting unit to project the image being displayed in the terminal device using the image information.

9 Claims, 10 Drawing Sheets

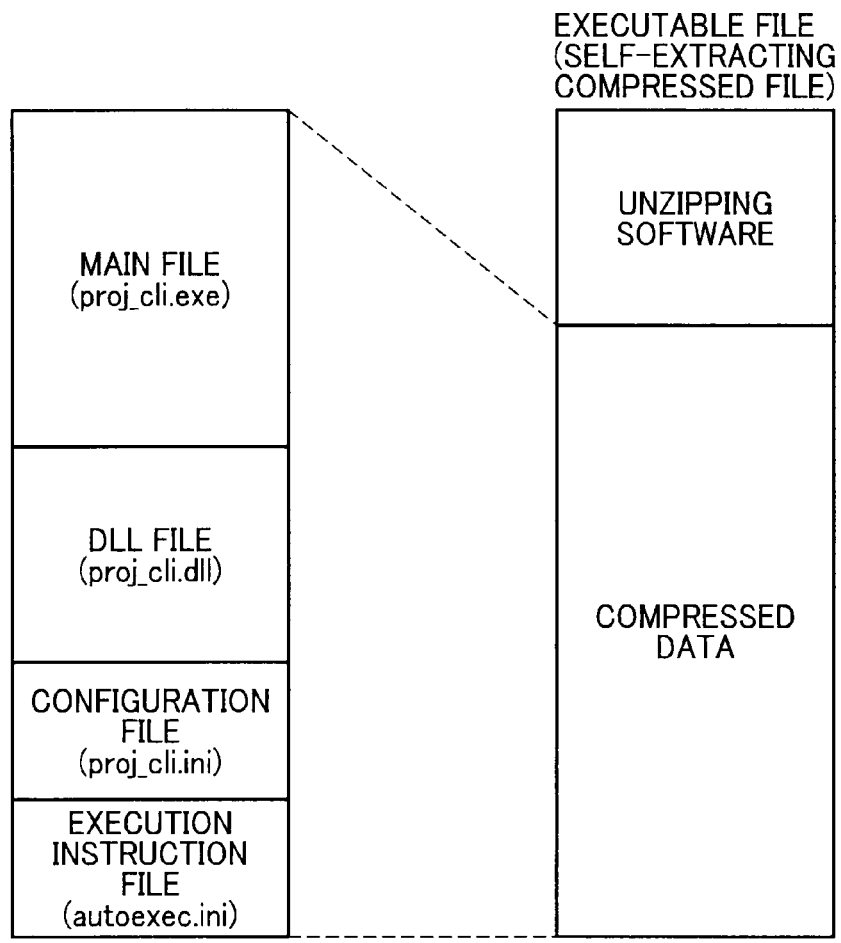

PROJECTOR, PROJECTOR SYSTEM, AND CONTROL METHOD

CROSS-REFERENCE TO RELATED APPLICATIONS

The present application claims priority to and incorporates by reference the entire contents of Japanese Patent Application No. 2009-212932 filed in Japan on Sep. 15, 2009.

BACKGROUND OF THE INVENTION

1. Field of the Invention

The present invention relates to a projector, a projector system, and a control method.

2. Description of the Related Art

Conventionally, a technique of transferring images displayed on a display of a personal computer (PC) to a projector and projecting them by the projector has been known. For example, Japanese Patent Application Laid-open No. 2007-264079 discloses a technique of connecting a projector with a PC via a universal serial bus (USB), which is a general purpose interface, and transferring images from the PC to the projector via the USB.

Besides the technique disclosed in Japanese Patent Application Laid-open No. 2007-264079, a technique of connecting a projector with a PC via a network and transferring images from the PC to the projector via the network has been known. In this technique, usually, by performing network setting and executing utility software for image transfer installed in the PC or software for image transfer standardly loaded in the OS, a network connection between the projector and the PC is established to start the image transfer from the PC to the projector.

However, in the abovementioned techniques, the projection of images by a projector needs preparatory operations such as set-up of the network, forcing the user to perform troublesome operations.

SUMMARY OF THE INVENTION

It is an object of the present invention to at least partially solve the problems in the conventional technology.

According to an aspect of the present invention, a projector connected to a terminal device via a network, includes: a confirming unit configured to confirm whether an IP address has been changed; a creating unit configured to create an executable file for executing image transfer software by using a changed IP address that is the IP address that has been changed, if the IP address is confirmed to have been changed; a delivering unit configured to deliver the executable file in response to a request from the terminal device; a receiving unit configured to receive, from the terminal device in which the image transfer software has been run by the executable file, a connection based on the changed IP address and receive a transfer of image information that is information on an image being displayed in the terminal device; and a projecting unit configured to project the image being displayed in the terminal device by using the image information.

According to another aspect of the present invention, a projector system comprises the projector and the terminal device that includes a requesting unit configured to request the projector to deliver the executable file; an executing unit configured to execute the image transfer software using the executable file; and a transfer unit configured to connect to the projector based on the changed IP address and transfer the image information on the image being displayed on a display unit.

According to still another aspect of the present invention, a control method executed in a projector connected to a terminal device via a network includes: confirming, by a confirming unit, whether an IP address has been changed; creating, by a creating unit, an executable file for executing image transfer software by using a changed IP address that is the IP address that has been changed, if the IP address is confirmed to have been changed; delivering, by a delivering unit, the executable file in response to a request from the terminal device; receiving, by a receiving unit, from the terminal device in which the image transfer software has been run by the executable file, a connection based on the changed IP address and a transfer of image information that is information on an image being displayed in the terminal device; and projecting, by a projecting unit, the image being displayed in the terminal device by using the image information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram of an exemplary configuration of an executable file according to the present embodiment;

FIG. 4 illustrates an example of a configuration file according to the present embodiment;

FIG. 5 illustrates an example of an execution instruction file according to the present embodiment;

DETAILED DESCRIPTION OF THE PREFERRED EMBODIMENTS

Exemplary embodiments of a projector system, a control method, and a control computer program product according to the present invention are described in detail below with reference to the accompanying drawings. The present invention is not limited to these exemplary embodiments.

According to an embodiment of the present embodiment, when the internet protocol (IP) address of a projector is changed, the projector uses the changed IP address and creates an executable file for executing image transfer software, and delivers the executable file in response to a request from a terminal device. When the terminal device runs the executable file, a connection with the projector is automatically established based on the changed IP address, and transfer of images from the terminal device to the projector is started.

In this way, in the projector according to the present embodiment, because the image transfer software reflecting the latest IP address of the projector is created and delivered to the terminal device, preparatory operations such as installation of the image transfer software beforehand and set-up of network are able to be eliminated and usability is improvable.

Firstly, explained below is a configuration of a projector system according to the present embodiment.

Figure 1:
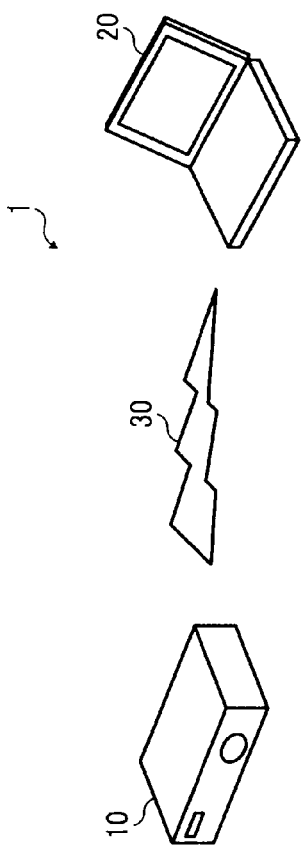
FIG. 1 is a schematic diagram of a configuration of a projector system according to an embodiment of the present invention.

FIG. 1 is a schematic diagram of an exemplary configuration of a projector system 1 according to the present embodiment. As illustrated in FIG. 1, the projector system 1 includes a projector 10 that projects images and a laptop PC 20 (as an exemplary terminal device) that transfers the images to the projector 10. The projector 10 is connected to the PC 20 via a network 30, which may be any network, such as a network that is wired or wireless, and that is a local area network (LAN) or a public communication line network. In the present embodiment, the network 30 is assumed to be a wireless LAN.

Figure 2:
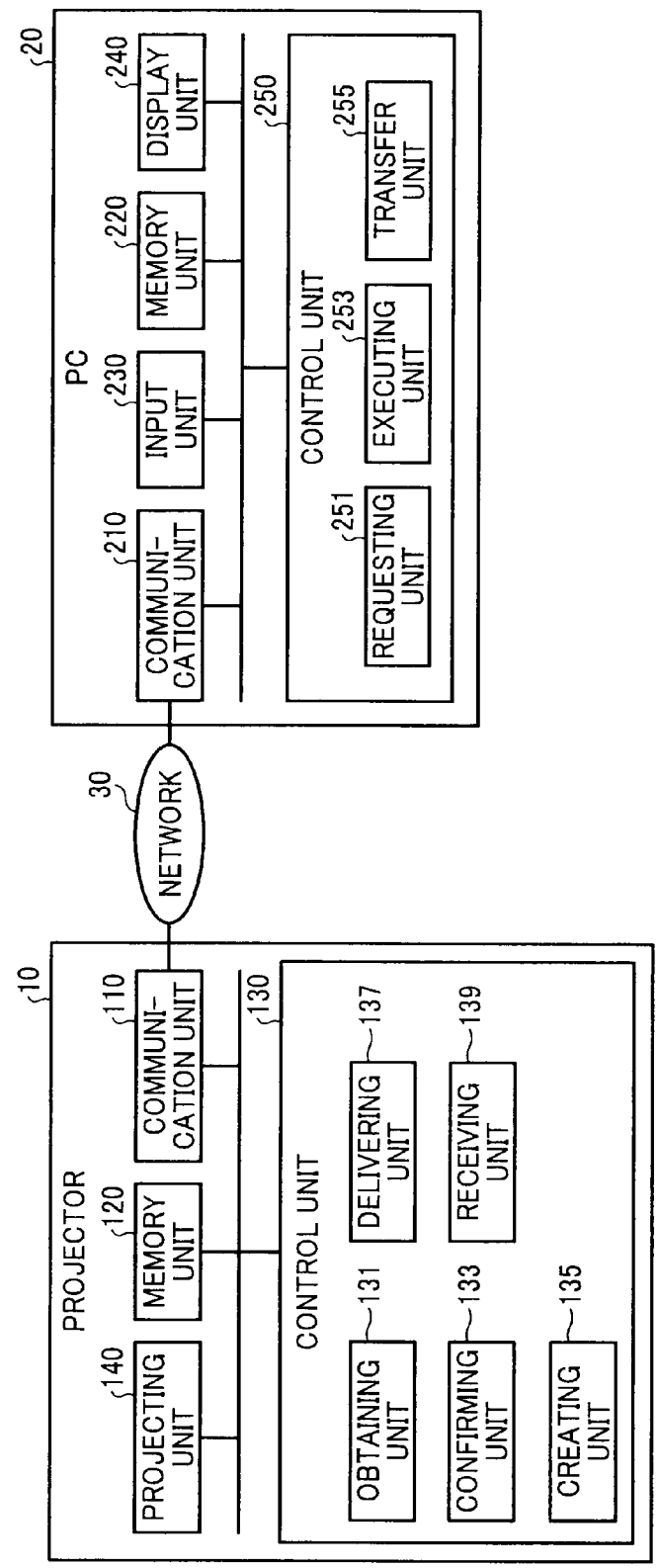
FIG. 2 is a block diagram of an exemplary functional configuration of the projector system according to the present embodiment.

FIG. 2 is a block diagram of an exemplary functional configuration of the projector system 1 according to the present embodiment. As illustrated in FIG. 2, the projector 10 includes a communication unit 110, a memory unit 120, a control unit 130, and a projecting unit 140.

The communication unit 110 transmits and receives information to and from an external device such as the PC 20 via the network 30. For example, the communication unit 110 may be implemented with an existing communication device such as a communication interface. Moreover, for example, the communication unit 110 receives a request for an executable file of image transfer software from the PC 20 and transmits that executable file to the PC 20 in response to the request.

The memory unit 120 stores various computer programs that are executed in the projector 10, information required in various operations performed in the projector 10, and the executable file of the image transfer software created by the control unit 130 described later. For example, the memory unit 120 may be implemented with an existing memory device such as a hard disk drive (HDD), a solid state drive (SSD), a memory card, an optical disk, a read only memory (ROM), or a random access memory (RAM), which is able to store information magnetically, optically, or electrically.

The control unit 130 controls each element of the projector 10 and may be implemented with an existing control device such as a central processing unit (CPU). The control unit 130 includes an obtaining unit 131, a confirming unit 133, a creating unit 135, a delivering unit 137, and a receiving unit 139.

The obtaining unit 131 obtains the IP address of the projector 10 via the communication unit 110 from a dynamic host configuration protocol (DHCP) server (not illustrated) that is connected to the network 30. For example, the obtaining unit 131 may be implemented with DHCP client software. In the present embodiment, the IP address is set to be automatically obtained and the obtaining unit 131 periodically obtains the IP address from the DHCP server.

The confirming unit 133 confirms whether the IP address of the projector 10 has been changed. More particularly, the confirming unit 133 compares the latest IP address obtained by the obtaining unit 131 with the previous IP address obtained by the obtaining unit 131 and confirms whether the IP address has been changed.

If the confirming unit 133 confirms that the IP address of the projector 10 has been changed, the creating unit 135 uses the changed IP address and creates an executable file for executing the image transfer software. More particularly, if the IP address is confirmed to have been changed, the creating unit 135 creates a configuration file describing the changed IP address. Then, the creating unit 135 creates the executable file by appending the configuration file to a main file, which refers to the configuration file to execute the image transfer software.

In the present embodiment, the creating unit 135 compresses the configuration file, an execution instruction file describing the file name of the main file, the main file, and a dynamic link library (DLL) file to create compressed data. Then, the creating unit 135 creates the executable file by appending, to the compressed data, unzipping software that unzips the compressed data and runs the file having the file name described in the unzipped execution instruction file.

The execution instruction file, the main file, the DLL file, and the unzipping software are stored in advance in the memory unit 120. The DLL file is for capturing the images to be transferred and is called as necessary after the main file is run. Instead of creating the DLL file separately from the main file, the DLL file may be integrated with the main file.

FIG. 3 is a schematic diagram of an exemplary configuration of the executable file according to the present embodiment. As illustrated in FIG. 3, the executable file according to the present embodiment is a self-extracting compressed file configured to include the compressed data and the unzipping software that unzips the compressed data. The compressed data includes four files, namely, the main file (proj_cli.exe), the DLL file (proj_cli.dll), the configuration file (proj_cli.ini), and the execution instruction file (autoexec.ini).

FIG. 4 illustrates an example of the configuration file according to the present embodiment. As illustrated in FIG. 4, in the configuration file according to the present embodiment, a variety of information, which is referred to by the main file, such as the changed IP address is described.

FIG. 5 illustrates an example of the execution instruction file according to the present embodiment. As illustrated in FIG. 5, in the execution instruction file according to the present embodiment, the file name "proj_cli.exe" of the main file is described. By this, the unzipping software is able to run the main file after unzipping the compressed data.

In FIG. 2, in response to a request from the PC 20, the delivering unit 137 delivers the executable file created by the creating unit 135 to the PC 20 via the communication unit 110. In the present embodiment, the delivering unit 137 functions as a hypertext transfer protocol (HTTP) server and performs HTTP communications with a Web browser operating on the PC 20.

The receiving unit 139 receives, via the communication unit 110, a connection based on the changed IP address from the PC 20 in which the image transfer software has been executed by the executable file and receives image information, which is the information on images being displayed on the PC 20. In the present embodiment, the receiving unit 139 functions as a remote image display server and performs communications with the image transfer software, which is operating on the PC 20, by using the remote desktop protocol (RDP), the remote frame buffer (RFB) protocol, or the X protocol. The receiving unit 139 receives the image information on all the images that are being displayed initially on the PC 20. Thereafter, the receiving unit 139 receives the image information regarding only updated images of images being displayed on the PC 20.

The projecting unit 140 uses the image information received by the receiving unit 139 to project the images being displayed on the PC 20. For example, the projecting unit may be implemented with a video card or the like. When the projector 10 is being activated, the projecting unit 140 projects an initial screen and when the receiving unit 139 receives the image information, the projecting unit 140 projects the images being displayed on the PC 20 by superimposing them on the initial screen.

In the present embodiment, when the confirming unit 133 confirms that the IP address of the projector 10 has been changed, the projecting unit 140 projects the changed IP address or information based on the changed IP address by reflecting it on the initial screen. Moreover, the projecting unit 140 projects authentication information that is used when the PC 20 requests the delivery of the executable file by reflecting it on the initial screen. The information based on the changed IP address may be, for example, a host name, and the authentication information may be, for example, a password.

As illustrated in FIG. 2, the PC 20 includes a communication unit 210, a memory unit 220, an input unit 230, a display unit 240, and a control unit 250.

The communication unit 210 transmits and receives information to and from an external device such as the projector 10 via the network 30. The communication unit 210 may be implemented with an existing communication device such as a communication interface. Moreover, for example, the communication unit 110 requests the projector 10 to deliver the executable file of the image transfer software and then receives that executable file from the projector 10.

The memory unit 220 stores various computer programs that are executed in the PC 20 and store information required in various operations performed in the PC 20. For example, the memory unit 220 may be implemented with an existing memory device such as an HDD, an SSD, a memory card, an optical disk, a ROM, or a RAM in which the information is storable magnetically, optically, or electrically.

The input unit 230 is configured to input various operations and may be implemented with an existing input device such as a keyboard, a mouse, or a touch-screen.

The display unit 240 displays various images and may be implemented with an existing display device such as a liquid crystal display or touch-screen display.

The control unit 250 controls each element of the PC 20 and may be implemented with an existing control device such as a CPU. The control unit 250 includes a requesting unit 251, an executing unit 253, and a transfer unit 255.

The requesting unit 251 requests the projector 10 via the communication unit 210 to deliver the executable file and obtains the executable file. In the present embodiment, the requesting unit 251 functions as a Web browser and performs HTTP communications with the HTTP server operating on the projector 10.

The executing unit 253 executes the image transfer software using the executable file obtained by the requesting unit 251. In the present embodiment, the executing unit 253 may be implemented with unzipping software or the OS. More particularly, when the requesting unit 251 obtains the executable file, the executing unit 253 decompresses the compressed data and extracts the main file, the DLL file, the configuration file, and the execution instruction file into the current directory inside the memory unit 220. As illustrated in FIG. 5, in the present embodiment, because in the execution instruction file, the name of the main file is described, the executing unit 253 runs the main file after unzipping of the compressed data.

The transfer unit 255 connects to the projector 10 on the basis of the changed IP address that is included in the executable file obtained by the requesting unit 251 and transfers the image information on the images displayed on the display unit 240. In the present embodiment, the transfer unit 255 may be implemented with the main file, the DLL file, and the OS.

More particularly, when the executing unit 253 runs the main file, the transfer unit 255 obtains the changed IP address described in the configuration file. Subsequently, based on the changed IP address, the transfer unit 255 establishes a connection by the RDP, the RFB protocol, or the X protocol with the remote image display server operating on the projector 10. Upon establishing that connection, the transfer unit 255 transfers the image information on all the images that are being displayed initially on the display unit 240. Thereafter, the transfer unit 255 transfers the image information on only the updated images of the images being displayed on the display unit 240.

When an end operation is input through the input unit 230, the transfer unit 255 terminates the connection with the projector 10 and deletes the executable file.

Explained below are the operations performed in the projector system 1 according to the present embodiment.

Figure 6:
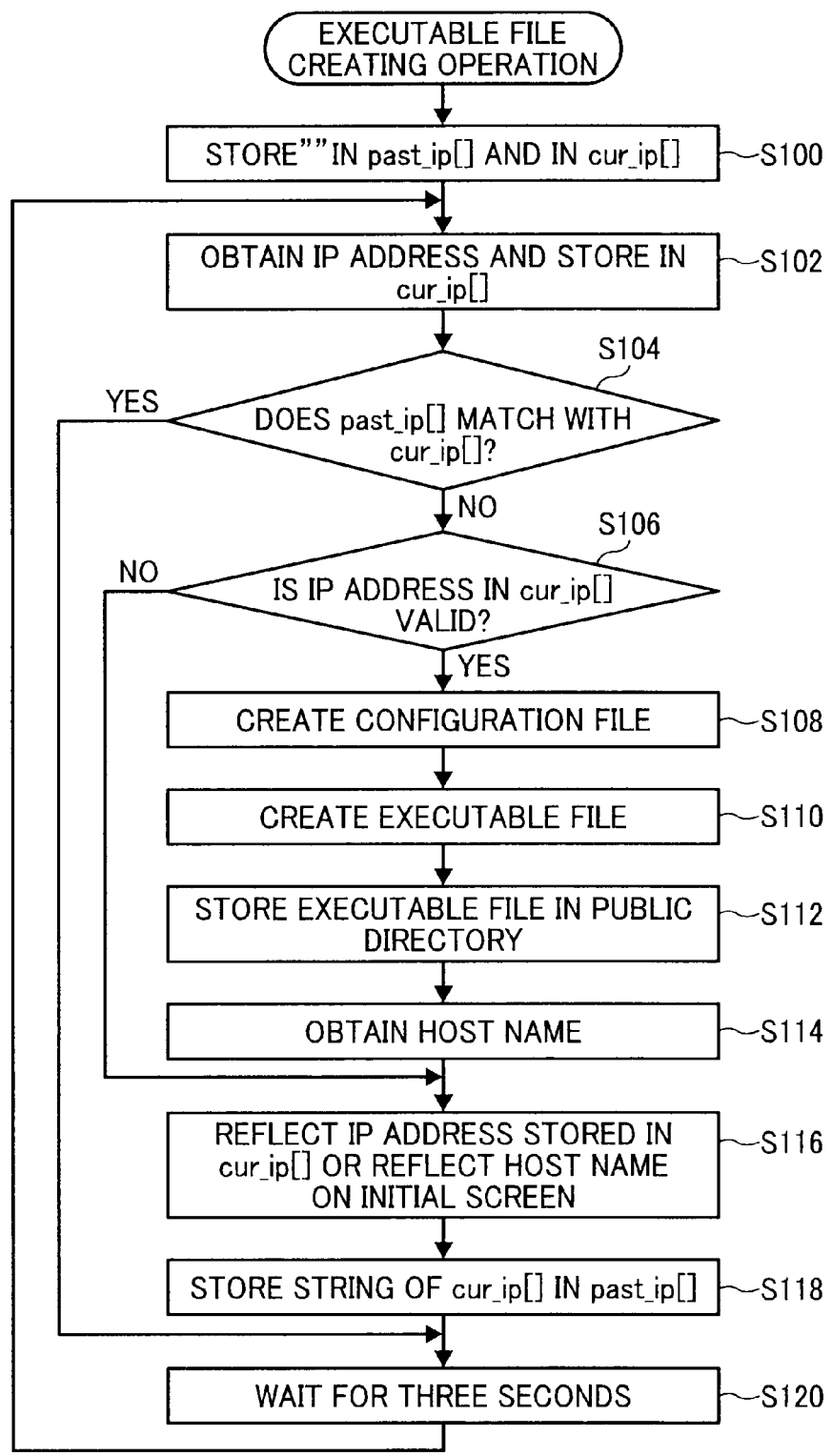
FIG. 6 is a flowchart for explaining an executable file creating operation performed by a projector according to the present embodiment.

FIG. 6 is a flowchart for explaining an executable file creating operation performed in the projector 10 according to the present embodiment. The executable file creating operation is continuously performed while the projector 10 is being activated.

Firstly, along with the activation of the projector 10, the obtaining unit 131 stores an empty character string in an array past_ip[ ] and in an array cur_ip[ ] (Step S100).

Then, the obtaining unit 131 obtains the IP address from the DHCP server connected to the network 30 and stores the character string of the obtained IP address in the array cur_ip[ ] (Step S102). However, since obtaining the IP address takes a predetermined amount of time, the obtaining unit 131 is not able to obtain the IP address until a predetermined amount of time elapses since the activation of the projector 10. Accordingly, until the IP address is obtained, an empty character string is stored in the array cur_ip[ ]. After the IP address is obtained, the obtained IP address is stored in the array cur_ip[ ] in the format of "aaa.bbb.ccc.ddd". If the obtaining unit 131 fails to obtain the IP address, then an empty character string is stored in the array cur_ip[ ].

Subsequently, the confirming unit 133 confirms whether the character string stored in the array past_ip[ ] matches the character string stored in the array cur_ip[ ] and confirms whether the IP address has been changed (Step S104).

If the character string stored in the array past_ip[ ] does not match with the character string stored in the array cur_ip[ ] and thus a change in the IP address has been confirmed (No at Step S104), then the confirming unit 133 confirms whether the character string stored in the array cur_ip[ ] is a valid IP address (Step S106). For example, if the character string stored in the array cur_ip[ ] is in the format of "aaa.bbb.ccc.ddd", then the confirming unit 133 determines that the IP address is valid.

Meanwhile, if the character string stored in the array past_ip[ ] matches the character string stored in the array cur_ip[ ] and thus no change in the IP address has been confirmed (Yes at Step S104), then the system control proceeds to Step S120. Moreover, if the confirming unit 133 confirms that the string stored in the array cur_ip[ ] is not a valid IP address (No at Step S106), then the system control proceeds to Step S116.

If the character string stored in the array cur_ip[ ] is a valid IP address (Yes at Step S106), then the creating unit 135 creates the configuration file in which the changed IP address (IP address represented by the character string stored in the array cur_ip[ ]) is described as illustrated in FIG. 4 (Step S108).

Subsequently, the creating unit 135 compresses the main file, the DLL file, the configuration file in which the changed IP address is described, and the execution instruction file to create compressed data. Then, the creating unit 135 creates the executable file as illustrated in FIG. 3 by appending the unzipping software to the compressed data (Step S110).

Subsequently, the creating unit 135 stores the created executable file in the public directory inside the memory unit 120 (Step S112). As a result, the executable file becomes a public access file for an external device such as the PC 20. Thus, the PC 20 is allowed to request the delivery of the executable file.

The obtaining unit 131 obtains, from a domain name system (DNS) server (not illustrated) connected to the network 30, the host name corresponding to the IP address stored in the array cur_ip[ ] (Step S114). However, since the IP address stored in the array cur_ip[ ] is not always registered in the DNS server, there are times when the obtaining unit 131 fails to obtain the host name.

On the initial screen projected upon the activation of the projector 10, the projecting unit 140 reflects the IP address stored in the array cur_ip[ ] or the host name obtained from the DNS server (Step S116).

Figure 7:
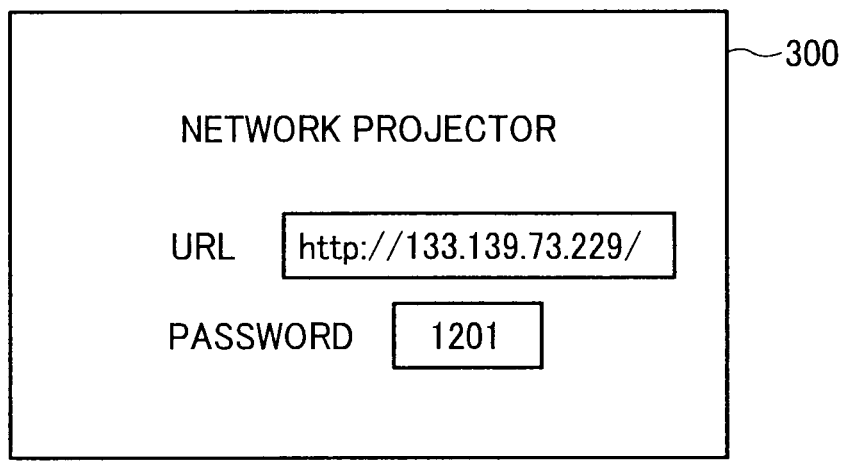
FIG. 7 is a schematic diagram of an exemplary initial screen projected by a projecting unit of the projector according to the present embodiment.

FIG. 7 is a schematic diagram of an exemplary initial screen 300 projected by the projecting unit 140 in the projector 10 according to the present embodiment. In the example illustrated in FIG. 7, on the initial screen 300 on the projector 10, a uniform resource locator (URL) and a password are displayed. The URL represents the IP address stored in the array cur_ip[ ] in the URL format and indicates the URL of the HTTP server functioning in the projector 10. The password is the authentication information required at the time of connecting with the HTTP server running in the projector 10. Thus, the URL and password displayed on the initial screen are the necessary information for the PC 20 at the time of requesting the delivery of the executable file.

If the IP address has not been obtained yet, an empty character string is stored in the array cur_ip[ ] and no URL is displayed on the initial screen. Moreover, if the IP address is stored in the array cur_ip[ ] but if the host name has not been obtained, then the IP address is displayed in the URL format on the initial screen as illustrated in FIG. 7. Furthermore, if the IP address is stored in the array cur_ip[ ] and if the host name has not been obtained, then the host name is displayed in the URL format on the initial screen.

In FIG. 6, the obtaining unit 131 updates the character string stored in the array past_ip[ ] with the character string stored in the array cur_ip[ ] (Step S118).

Subsequently, the obtaining unit 131 waits for three seconds (Step S120) before returning to Step S102.

Figure 8:
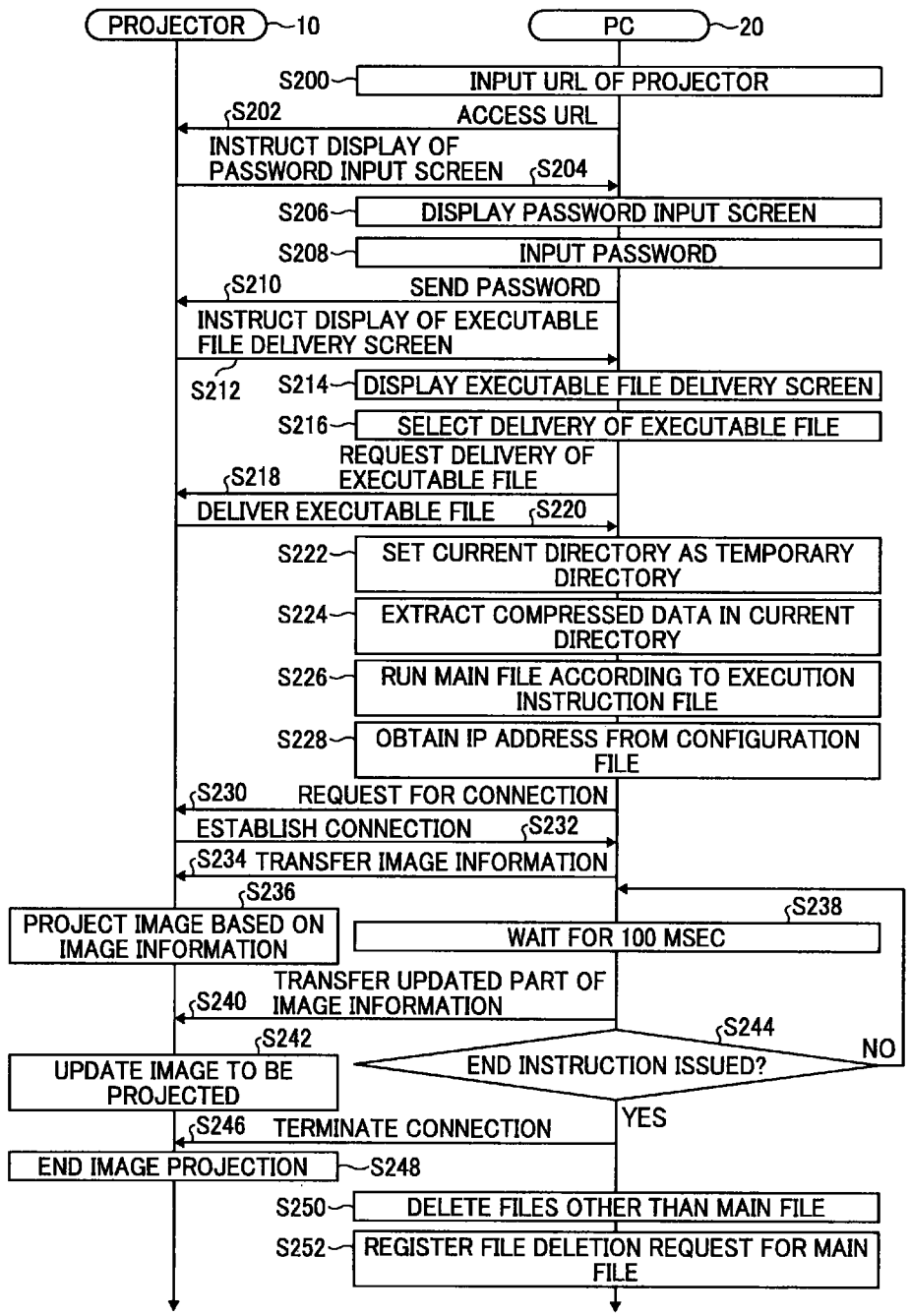
FIG. 8 is a sequence diagram for explaining an image transfer operation performed in the projector system according to the present embodiment.

FIG. 8 is a sequence diagram for explaining an image transfer operation performed in the projector system 1 according to the present embodiment.

Figure 9:
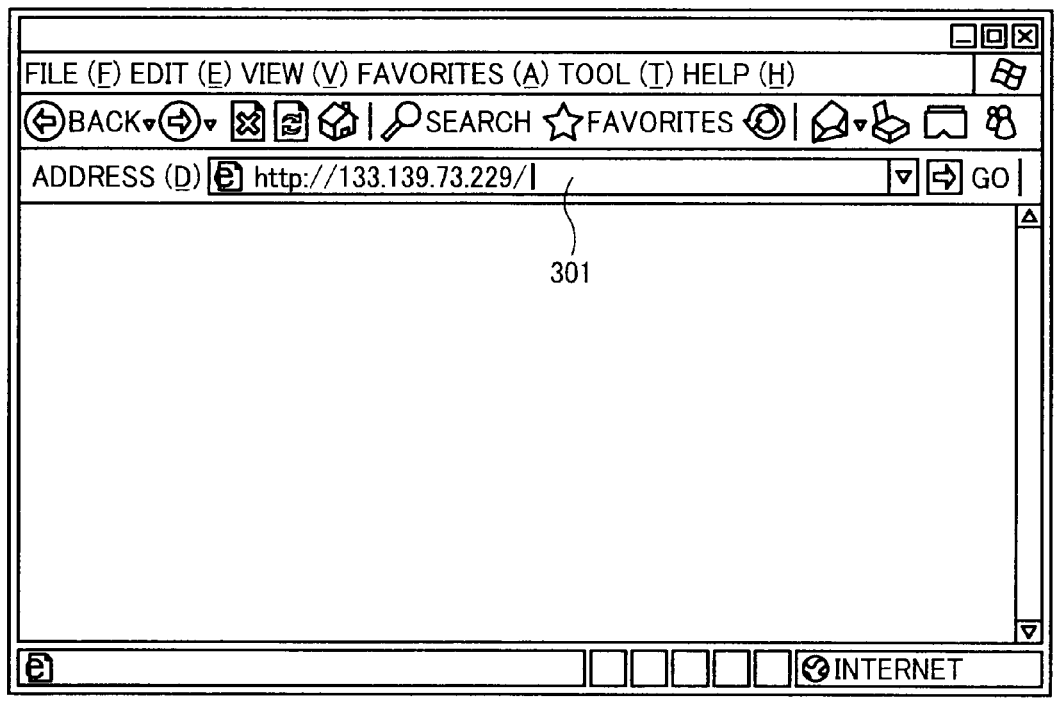
FIG. 9 is a diagram of an exemplary Web browser screen displayed on a display unit of a PC according to the present embodiment.

Firstly, the input unit 230 in the PC 20 inputs the URL of the projector 10 in an address bar 301 of the Web browser screen displayed on the display unit 240 as illustrated in FIG. 9 (Step S200). The URL of the projector 10 is also displayed on the initial screen projected on the projector 10 as illustrated in FIG. 7.

Subsequently, based on the URL input by the input unit 230, the requesting unit 251 in the PC 20 accesses the HTTP server in the projector 10 (Step S202).

Upon receiving an access from the PC 20, the delivering unit 137 in the projector 10 instructs the PC 20 to display a password input screen (Step S204).

Figure 10:
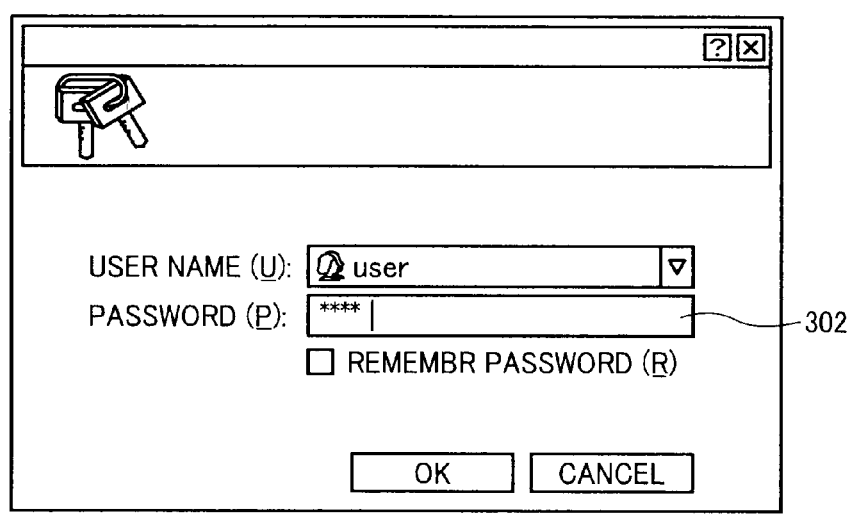
FIG. 10 is a diagram of an exemplary password input screen displayed on the display unit of the PC according to the present embodiment.

Upon receiving the instruction to display a password input screen from the projector 10, the requesting unit 251 displays a password input screen on the display unit 240 as illustrated in FIG. 10 (Step S206).

In a password entry field 302 of the password input screen displayed on the display unit 240 as illustrated in FIG. 10, the input unit 230 inputs the password (Step S208). The password of the projector 10 is displayed on the initial screen 300 projected by the projecting unit 140 in the projector 10 as illustrated in FIG. 7.

The requesting unit 251 then sends the password input by the input unit 230 to the HTTP server in the projector 10 (Step S210).

Upon receiving the password from the PC 20, the delivering unit 137 authenticates the password and, if authentication is successful, instructs the PC 20 to display an executable file delivery screen (Step S212). Meanwhile, if the authentication is not successful, then the delivering unit 137 does not instruct the PC 20 to display an executable file delivery screen and reports to the PC 20 that the password is incorrect.

Figure 11:
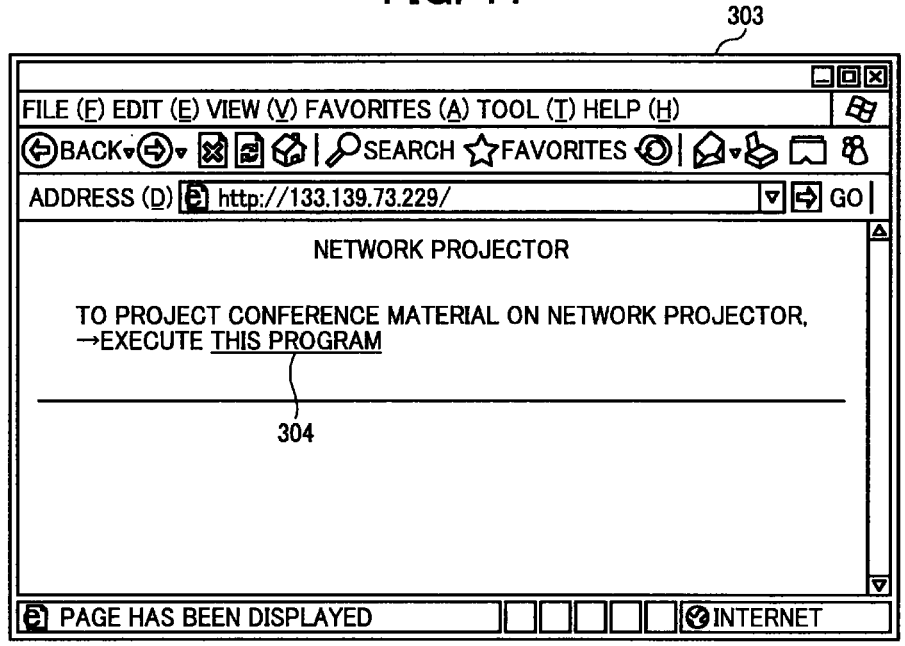
FIG. 11 is a diagram of an exemplary executable file delivery screen displayed on the display unit of the PC according to the present embodiment.

Upon receiving the instruction to display an executable file delivery screen, the requesting unit 251 displays an executable file delivery screen 303 on the Web browser as illustrated in FIG. 11 (Step S214).

Figure 12:
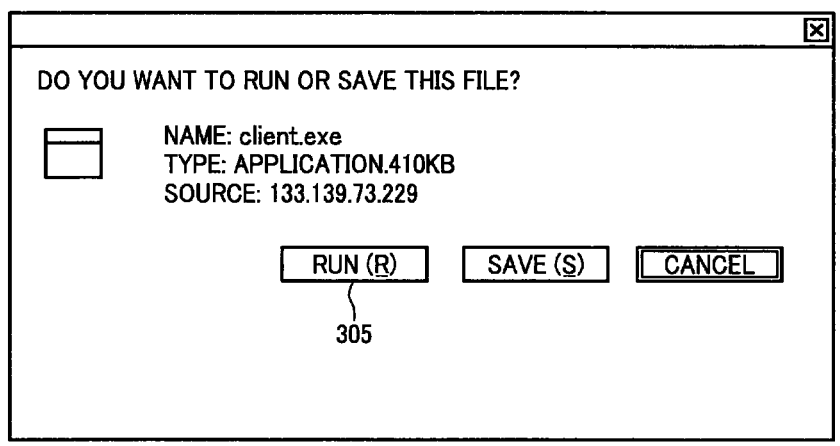
FIG. 12 is a diagram of an exemplary confirmation screen displayed on the display unit of the PC according to the present embodiment.

When the input unit 230 selects a link 304 on the executable file delivery screen 303 illustrated in FIG. 11, a confirmation screen as illustrated in FIG. 12 is displayed on the display unit. By selecting a "run" button 305 on the confirmation screen illustrated in FIG. 12, the input unit 230 selects the delivery of the executable file (Step S216).

When the executable file delivery is selected by the input unit 230, the requesting unit 251 requests the HTTP server in the projector 10 to deliver the executable file (Step S218).

Upon receiving the executable file delivery request from the PC 20, the delivering unit 137 delivers the executable file (Step S220).

When the projector 10 delivers the executable file, the executing unit 253 in the PC 20 sets the current directory as the temporary directory (Step S222).

Then, the executing unit 253 decompresses the compressed data by executing the unzipping software included in the executable file and unzips the main file, the DLL file, the configuration file, and the execution instruction file in the current directory (Step S224).

After unzipping the compressed data, the executing unit 253 runs the main file according to the execution instruction file (Step S226).

Subsequently, the transfer unit 255 obtains the IP address from the configuration file (Step S228) and requests the remote screen display server in the projector 10 to establish a connection by the RDP (Step S230).

Upon receiving the connection request from the PC 20, the receiving unit 139 in the projector 10 establishes a connection with the image transfer software in the PC 20 (Step S232).

Once the connection is established with the remote screen display server in the projector 10, the transfer unit 255 transfers the image information on all the images being displayed on the display unit 240 to the remote screen display server in the projector 10 (Step S234).

When the receiving unit 139 receives the image information transferred from the PC 20, the projecting unit 140 projects images based on that image information (Step S236).

Figure 13:
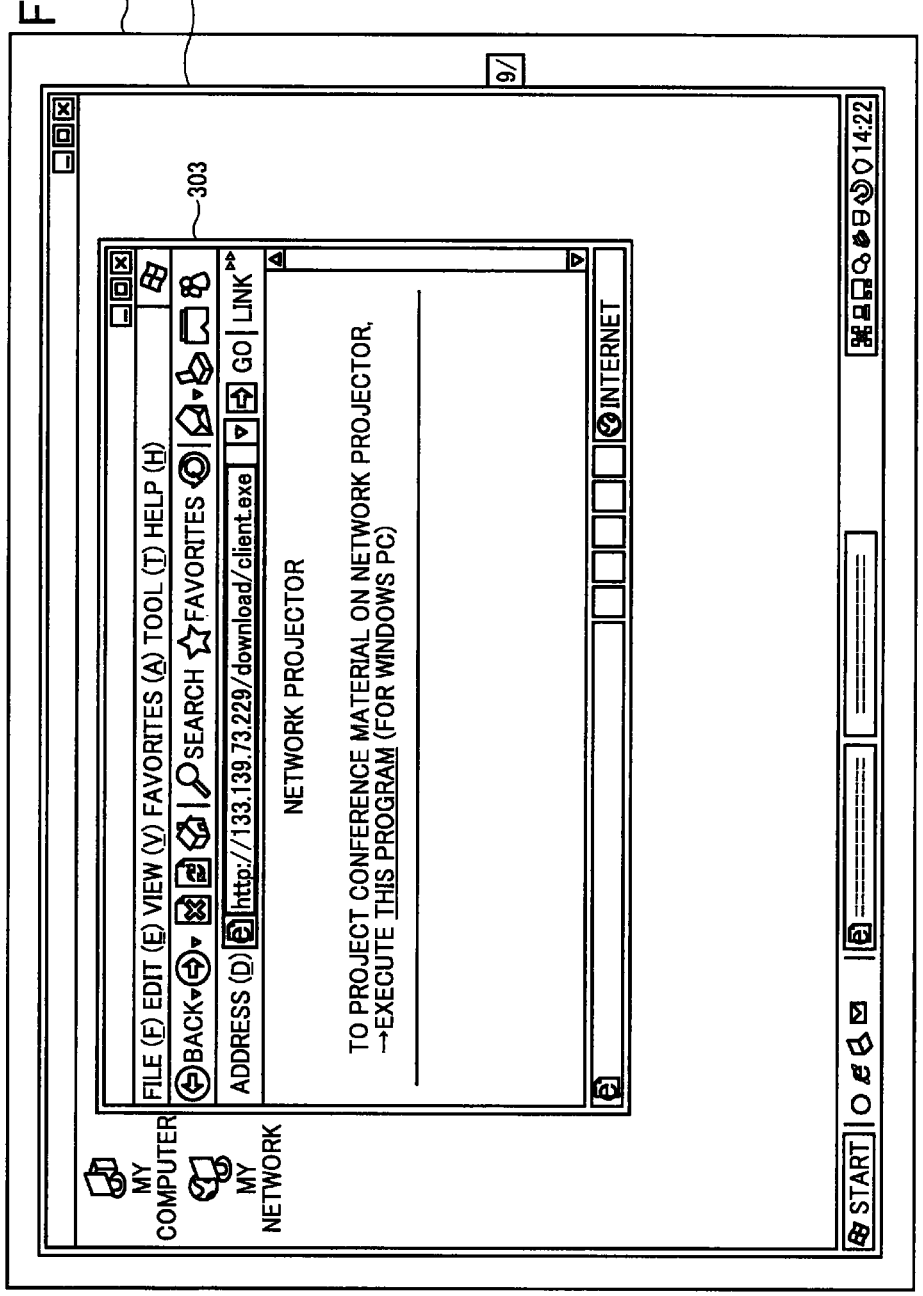
FIG. 13 is a diagram of an exemplary image projected by the projecting unit in the projector according to the present embodiment.

FIG. 13 is a diagram of an exemplary image projected by the projecting unit 140 in the projector 10. In the example illustrated in FIG. 13, the projecting unit 140 projects a desktop screen 306 being displayed on the display unit 240 in the PC 20 by superimposing the desktop screen 306 on the initial screen 300 illustrated in FIG. 7. On the desktop screen 306, the executable file delivery screen 303 is also displayed.

In FIG. 8, after transferring the image information, the transfer unit 255 waits for 100 milliseconds (Step S238) and then confirms the display contents of the images displayed on the display unit 240 by polling. If any of the display contents are confirmed to have been updated, the transfer unit 255 transfers, to the remote image display server in the projector 10, the image information regarding on the updated images of the images that were being displayed on the display unit 240 before the waiting operation (Step S240).

When the receiving unit 139 receives the image information regarding the updated contents from the PC 20, the projecting unit 140 updates the images based on the newly-received image information and again projects the updated images (Step S242).

Figure 14:
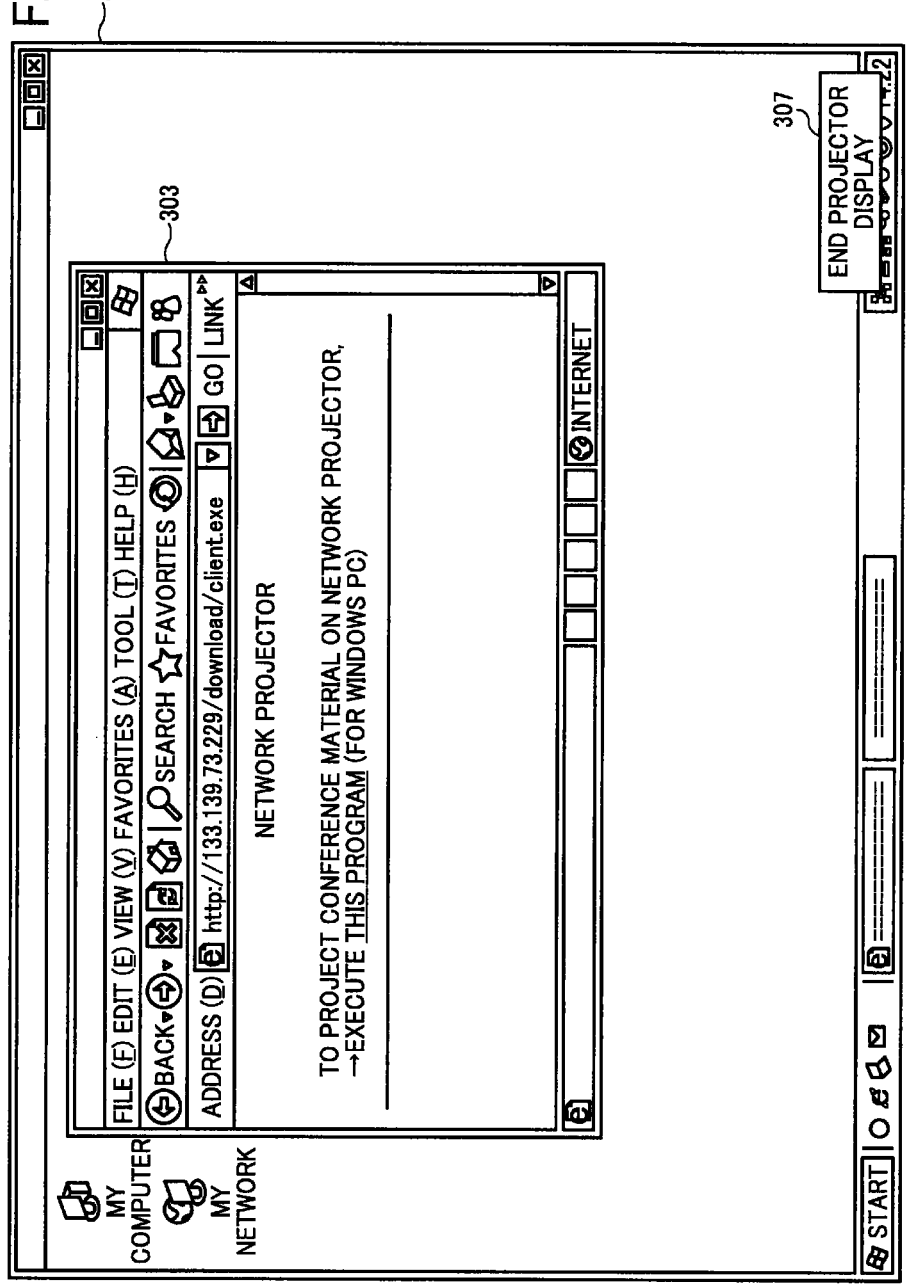
FIG. 14 is a diagram of an exemplary image displayed on the display unit of the PC according to the present embodiment.

If the an exit menu 307 displayed on the display unit 240 as illustrated in FIG. 14 is selected by the input unit 230 as an instruction to end (Yes at Step S244), the transfer unit 255 terminates the connection with the remote image display server in the projector 10 (Step S246). If the instruction to end is not issued (No at Step S244), the transfer unit 255 returns to Step S238.

Upon termination of the connection with the image transfer software in the PC 20, the projecting unit 140 ends the projection of the images based on the image information received by the receiving unit 139 (Step S248).

Upon termination of the connection with the remote image display server in the projector 10, the transfer unit 255 deletes the files other than the main file (i.e., deletes the DLL file, the configuration file, the execution instruction file, and the unzipping software) (Step S250). At this point in time, the transfer unit 255 is not able to delete the main file because it is still being run.

Hence, in order to delete the main file after the PC is rebooted, the transfer unit 255 registers a file deletion request with respect to the OS (Step S252). For example, if the OS is of Windows (registered trademark), the transfer unit 255 specifies an argument "MOVEFILE_DELAY_UNTIL_REBOOT" and calls an application program interface (API) "MoveFileEx( )". Consequently, when the PC 20 is rebooted, the transfer unit 255 deletes the main file.

Explained below is an exemplary hardware configuration of the projector system 1 according to the present embodiment.

Figure 15:
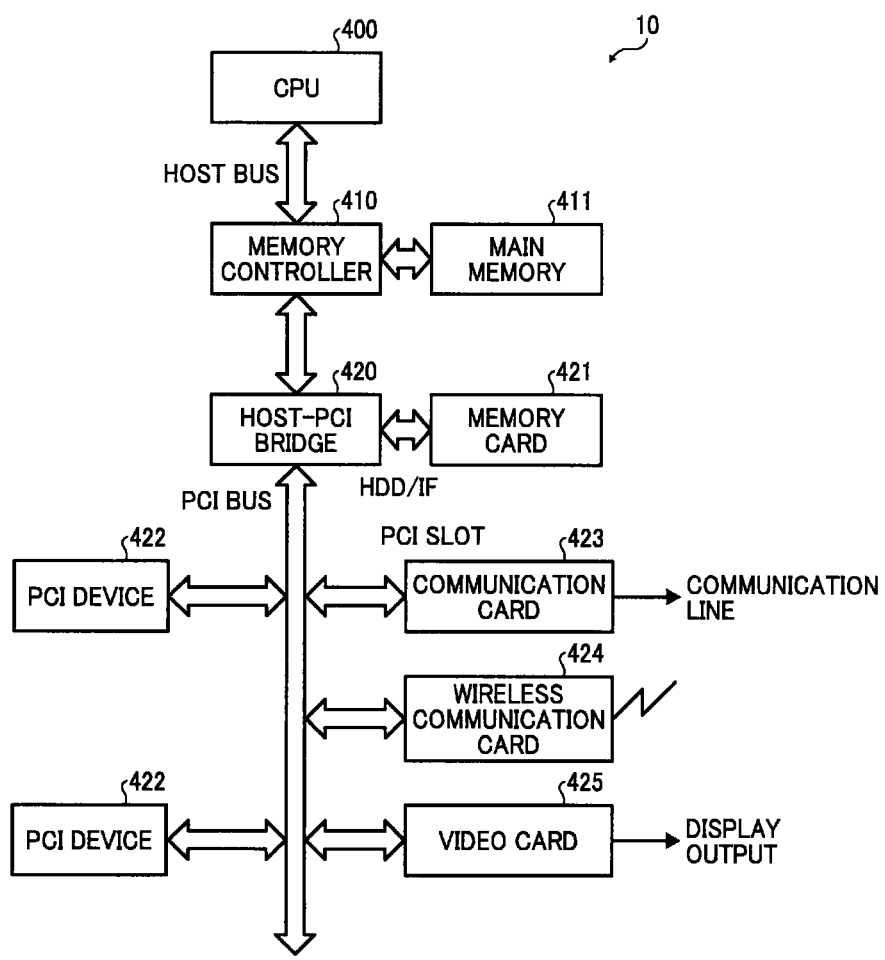
FIG. 15 is a block diagram of an exemplary hardware configuration of the projector according to the present embodiment.

FIG. 15 is a block diagram of an exemplary hardware configuration of the projector 10 according to the present embodiment. As illustrated in FIG. 15, the projector 10 includes a CPU 400, a memory controller 410, a main memory 411, and a host-PCI bridge 420. The memory controller 410 is connected to the CPU 400, the main memory 411, and the host-PCI bridge 420 via host buses.

The CPU 400 controls the projector 10 in entirety. The memory controller 410 controls reading and writing with respect to the main memory 411, which is a system memory used as a memory for storing programs or data, a memory for extracting programs or data, and a rendering memory.

The host-PCI bridge 420 functions as a bridge for connection of a peripheral device and/or a peripheral component interconnect (PCI) device. The host-PCI bridge 420 is connected to a memory card 421 by an HDD interface (I/F) and is connected to PCI devices 422 by a PCI bus. Moreover, the host-PCI bridge 420 is connected to a communication card 423, a wireless communication card 424, and a video card 425 by PCI buses and PCI slots.

The memory card 421 is sued as a boot device of the OS. The communication card 423 and the wireless communication card 424 are used for the connection with a network such as a LAN or a communication line. The video card 425 is used in projecting images and outputs video signals to a display output.

Meanwhile, a control program executed in the projector 10 according to the present embodiment is stored in advance in a storage memory of the main memory 411.

The control program executed in the projector 10 according to the present embodiment may be provided in the form of an installable file or an executable file on a computer-readable storage device such as a compact disk read only memory (CD-ROM), a flexible disk (FD), a compact disk recordable (CD-R), or a digital versatile disk (DVD).

The control program executed in the projector 10 according to the present embodiment may be saved on a computer connected to a network such as the Internet and downloaded therefrom via the network. The control program executed in the projector 10 according to the present embodiment may be made available for provision or distribution through a network such as the Internet.

The control program executed in the projector 10 according to the present embodiment has a module configuration for implementing each of the above mentioned elements on the computer. In the actual hardware, the CPU 400 reads the control program from the storage memory of the main memory 411 into the expansion memory of the main memory 411 to execute the control program so that the abovementioned elements are implemented on the computer.

The PC 20 according to the present embodiment has a hardware configuration utilizing a general computer and includes a control device such as a CPU; internal memory devices such as a ROM and a RAM; an external memory device such as an HDD, an SSD, and/or a removable disk drive; a display device such as a liquid crystal display; and an input device such as a keyboard and/or a mouse.

As described above, in the present embodiment, when the IP address of the projector 10 is changed, the projector 10 uses the changed IP address to create an executable file for executing the image transfer software. Then, upon request by the PC 20, the projector 10 delivers the executable file. By running the executable file delivered, the PC 20 automatically establishes a connection with the projector 10 based on the changed IP address and starts transferring images from the PC 20 to the projector 10.

Thus, according to the present embodiment, because the image transfer software in which the latest IP address of the projector 10 has been reflected is created and delivered to the PC 20, the preparatory operations such as the installation of the image transfer software beforehand or the set-up of network are able to be eliminated and the usability is improvable. Particularly, according to the present embodiment, just by inputting the URL of the projector 10 on the Web browser displayed on the PC 20 and running the executable file of the image transfer software downloaded, the transfer of images from the PC 20 to the projector 10 is started, and thus the usability of the projector is remarkably improved.

Moreover, in the present embodiment, the projector 10 appends to the main file the configuration file, in which a variety of information referred to by the main file, such as the changed IP address, is described, to generate the executable file. Hence, in the present embodiment, since the information referred to by the main file is described in the configuration file, there is no need to alter the registry settings to execute the image transfer software in the PC 20 and thus it is possible to avoid interference with image transfer software for other projectors.

Furthermore, in the present embodiment, when the execution of the image transfer software ends, the executable file is automatically deleted. Thus, the user does not have to perform the file deletion operation.

Moreover, in the present embodiment, since there is no need to use the image transfer software standardly installed in the operating system (OS), the freedom of design and development of the projector 10 is increased and it is not necessary to pay any license fee to the OS manufacturers, and thus the manufacturing cost is reduced.

In the present embodiment, the screen displayed on the display unit 240 of the PC 20 is configured to be projected as a single window on the projector 10. However, when a screen to be remotely displayed is widow-displayed, sometimes the screen is displayed reduced in size depending on the resolutions of the PC 20 and the projector 10, making it difficult to read small characters. Hence, instead of window-displaying, it is also possible to display the screen on the projector 10 in full-screen.

According to an aspect of the present invention, it becomes possible to eliminate the preparatory operations for projecting images on a projector.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection device for connection to a terminal device via a network, comprising:
    circuitry configured to:
        confirm whether an IP address of the projection device has been changed; and
        create an executable file for executing image transfer software by using a changed IP address that is the IP address that has been changed, if the IP address is confirmed to have been changed;
    a transmitter configured to transmit the executable file in response to a request from the terminal device;
    a receiver configured to receive, from the terminal device in which the image transfer software has been run by the executable file, a connection based on the changed IP address and receive a transfer of image information that is information of an image being displayed in the terminal device; and
    a projector configured to project the image being displayed in the terminal device by using the image information,
    wherein, if the IP address is confirmed to have been changed, the circuitry creates the executable file by creating a configuration file in which the changed IP address is described and appending the configuration file to a main file that refers to the configuration file and executes the image transfer software.

2. The projection device according to claim 1, wherein, the circuitry creates the executable file by compressing an execution instruction file in which a name of the main file is described, the configuration file, and the main file to create compressed data, and appending, to the compressed data created, unzipping software that unzips the compressed data and executes a file having the name described in the execution instruction file unzipped.

3. The projection device according to claim 1, wherein, the executable file created is a file that is deleted upon termination of a connection based on the changed IP address.

4. The projection device according to claim 1, wherein, as an initial screen, the projector projects an image in which the changed IP address or information based on the changed IP address has been reflected.

5. The projection device according to claim 4, wherein, in the initial screen, the projector projects the image in which authentication information used when delivery of the executable file is requested by the terminal device has been further reflected.

6. The projection device according to claim 1, wherein the receiver is configured to receive, from the terminal device, the connection based on the changed IP address by the remote desktop protocol (RDP), the remote frame buffer (RFB) protocol, or the X protocol.

7. A system comprising:
    a projection device connected to a terminal device via a network and including:
        circuitry configured to:
            confirm whether an IP address of the projection device has been changed; and
            create an executable file for executing image transfer software by using a changed IP address that is the IP address that has been changed, if the IP address is confirmed to have been changed;
        a transmitter configured to transmit the executable file in response to a request from the terminal device;
        a receiver configured to receive, from the terminal device in which the image transfer software has been run by the executable file, a connection based on the changed IP address and receive a transfer of image information that is information of an image being displayed in the terminal device; and
        a projector configured to project the image being displayed in the terminal device by using the image information,
        wherein, if the IP address is confirmed to have been changed, the projection device creates the executable file by creating a configuration file in which the changed IP address is described and appending the configuration file to a main file that refers to the configuration file and executes the image transfer software;

the terminal device including:
  circuitry configured to:
    request the projector to deliver the executable file; and
    execute the image transfer software using the executable file; and
  a transmitter configured to connect to the projection device based on the changed IP address and transfer the image information of the image being displayed on a display unit.

8. The system according to claim 7, wherein, based on an input of an end operation from an input device, the transmitter terminates the connection with the projection device and deletes the executable file.

9. A control method executed in a projection device connected to a terminal device via a network, the control method comprising:
  confirming whether an IP address of the projection device has been changed;
  creating an executable file for executing image transfer software by using a changed IP address that is the IP address that has been changed, if the IP address is confirmed to have been changed;
  delivering the executable file in response to a request from the terminal device;
  receiving from the terminal device in which the image transfer software has been run by the executable file, a connection based on the changed IP address and a transfer of image information that is information of an image being displayed in the terminal device; and
  projecting the image being displayed in the terminal device by using the image information,
  wherein, if the IP address is confirmed to have been changed, the projection device creates the executable file by creating a configuration file in which the changed IP address is described and appending the configuration file to a main file that refers to the configuration file and executes the image transfer software.

* * * * *